Patented Dec. 23, 1952

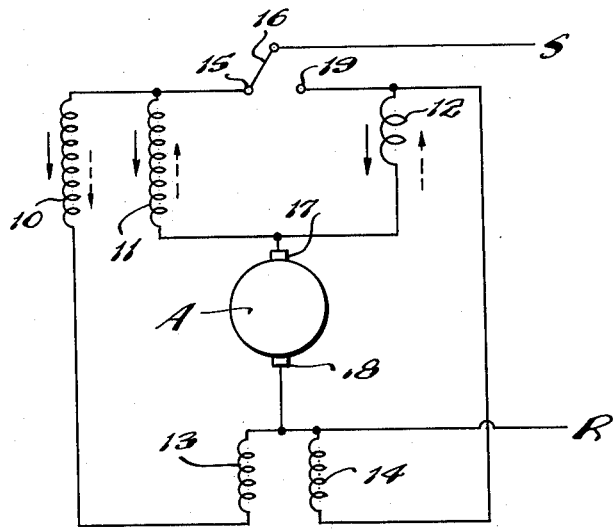
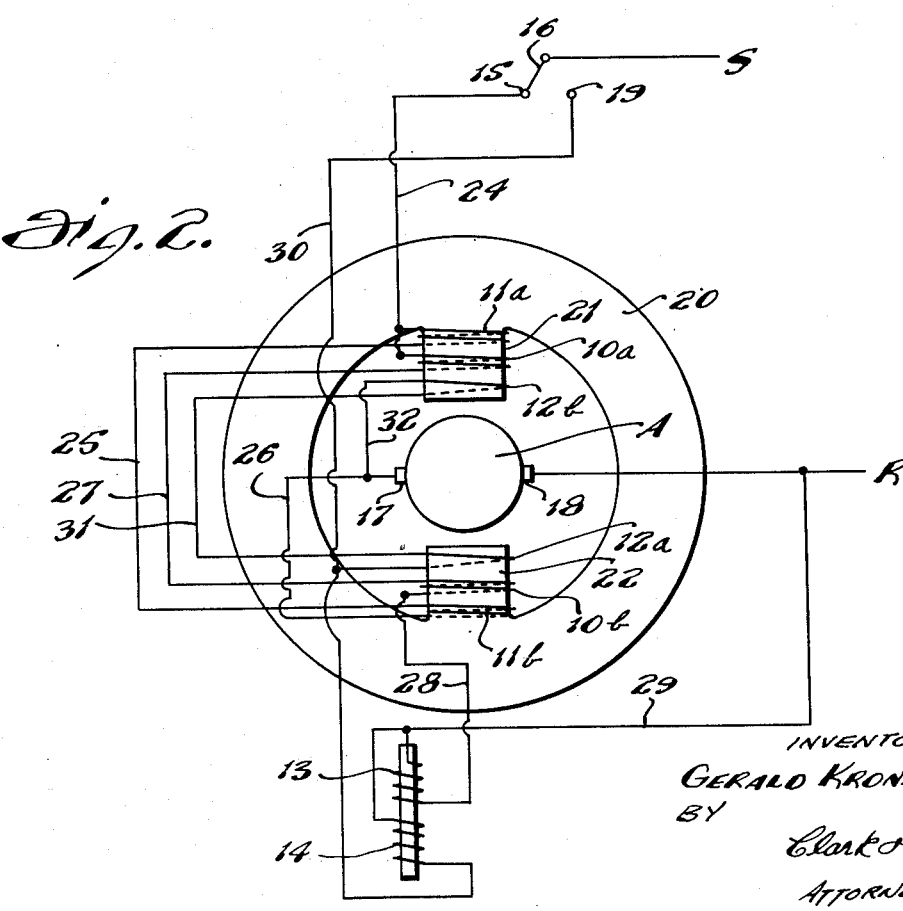

2,623,202

UNITED STATES PATENT OFFICE 2,623,202

REVERSIBLE DIRECT CURRENT MOTOR

Gerald Kronacher, New York, N. Y., assignor to Air Associates, Inc., Teterboro, N. J., a corporation of New Jersey Application January 21, 1950, Serial No. 139,814

2 Claims. (Cl. 318—298)

This invention relates to a reversible motor and has particular reference to a reversible direct current motor which is rotatable at a relatively high speed in one direction and at a relatively low speed in the opposite direction and which maintains substantially the same speed ratio with reference to the torque in both directions from no-load to stall.

The invention has in view a reversible direct current motor having field exciting windings which when energized effect rotation in one direction of the motor at high speed substantially as a series motor and in the opposite direction at low speed as a compound motor.

Still another object of the invention is to provide a reversible direct current motor in which certain of the field exciting windings are arranged to provide opposite excitation to thereby produce a weak resultant excitation of the motor to effect rotation in one direction at high speed and in which all of the field exciting windings are arranged to produce a strong resultant excitation and rotate the motor in the opposite direction at low speed.

Still another object of the invention is to provide a reversible motor which is adapted to be rotated in opposite directions by the movement of a single pole double-throw switch.

With the foregoing and other objects in view, reference is now made to the following specification and accompanying drawings in which the preferred embodiment of the invention is illustrated.

In the drawings:

Fig. 1 is a schematic view of the wiring diagram of a reversible direct current motor constructed in accordance with the invention.

Fig. 2 is a schematic view of the wiring applied to a two pole motor.

In the embodiment of the invention illustrated in the drawings, a wiring diagram of a reversible direct current motor is schematically shown in Fig. 1 thereof having three exciting field windings 10, 11 and 12. The exciting field windings 10 and 11 have substantially the same number of turns while the exciting field winding 12 is made up of a relatively lesser number of turns. Two resistor coils 13 and 14 are also provided which are wound upon a brake core so as to magnetize in the same direction for attracting an armature (not shown) to produce a braking action on the motor.

The exciting field winding 11 is connected at one end with a terminal 15 of a single pole double-throw switch 16 and at its opposite end the said winding is connected with a brush 17 of the motor. The exciting field winding 10 and the resistor coil 13 are connected in parallel with the exciting field winding 11 and with the armature A through the brush 17 and through the opposite brush 18. The exciting field winding 12 is connected at one end with a terminal 19 of the switch 16 and at its opposite end the said winding is connected with the brush 17 of the motor. The resistor coil 14 is connected in parallel with the exciting field winding 12 and with the armature A through the brushes 17 and 18. The switch 16 is connected with the positive side S of a source of electric power, while the brush 18 is connected with the negative side R of said source of electric power.

Connected in this manner, the windings will polarize as indicated by the solid arrows when the switch 16 is moved to closed relation with the terminal 15 thereof while the broken arrows indicate the polarization of the windings when the switch is moved to close the circuit with the terminal 19 thereof. It will be seen that the excitation produced by the flow of current through the windings 10 and 11 from the terminal 19 oppose each other and being substantially of the same number of turns produce no magnetic field. The excitation produced by the windings 12 sets up a weak field so that the motor runs at high speed in one direction. When the switch 16 is thrown to close the circuit with the terminal 15, the excitation produced by the flow of current through the windings 10, 11 and 12 is cumulative so that the motor operates as a compound motor with a strong field turning the motor at low speed in the opposite direction. The current flowing through the winding 12 and the resistor coil 14 produces a voltage drop in the winding 11 to lower the speed of the motor which is most effective at no-load condition.

The invention is illustrated in Fig. 2 of the drawings in its application to a two pole motor but which may be employed in a motor having any multiple sets of poles. The motor includes the usual frame 20 provided with poles 21 and 22 and having an armature A and the brushes 17 and 18 as hereinbefore described. The winding 11 is connected with the terminal 15 of the switch 16 by a conductor wire 24, the winding being arranged with one-half of the turns thereof, indicated by the reference character 11a, wound upon the pole 21 while the other half of the turns, indicated by the reference character 11b, is wound upon the pole 22 and connected with the portion 11a by a conductor wire 25. The winding 11b is connected to the brush 17 of the motor by a conductor wire 26. The winding 10 is also connected with the terminal 15 of the switch 16 by the conductor wire 24 and the said winding is arranged with one-half of the turns thereof, indicated by the reference character 10a, wound upon the pole 21 while the other half thereof, indicated by the reference character 10b, is wound upon the pole 22 and connected with the portion 10a by a conductor wire 27. The portion 10b of said winding is connected with one end of the resistor coil 13 by a conductor wire 28, the opposite end of the resistor coil 13 being connected with the brush 18 by a conductor wire 29. The winding 12 is connected with the terminal 19 of the switch 16 by means of a conductor wire 30, the said winding being arranged with one-half of the turns thereof, indicated by the reference character 12a, wound on the pole 22 while the other half thereof, indicated by the reference character 12b, is wound on the pole 21 and connected with the portion 12a thereof by a conductor wire 31. The portion 12b of the winding 12 is connected by a conductor wire 32 with the brush 17 of the motor. The conductor wire 30 leading from the terminal 19 is connected with one end of the resistor coil 14 while the opposite end of the resistor coil 14 is connected by the conductor wire 29 with the brush 18 of the motor.

When the switch 16 is moved to closed relation with the terminal 19, the excitation coil 12 is in series with the armature and the excitation coils 10 and 11 and the resistor coil 13 are in series and are shunted across the armature with the coils 10 and 11 functioning to neutralize each other. When the switch 16 is moved to closed relation with the terminal 15, the excitation coil 12 and the resistor coil 14 are in series and the same are shunted across the armature, the excitation coil 10 and the resistor coil 13 are in series and are shunted across the terminal 15 and the brush 18 and the coil 11 is in series with the armature, the coils 10 and 11 producing a cumulative excitation.

What is claimed is:

1. A reversible direct current motor having an armature and a field member provided with at least two poles, a continuous field exciting winding wound in series on said field poles and connected on one side with one of the poles of the armature and on the other side with a terminal of a switch, a second continuous field exciting winding wound in series on said field poles and connected on one side with the other terminal of said switch and on the opposite side with the same pole of the armature as the first mentioned winding, a third continuous field exciting winding wound in series on said field poles and connected on one side with the first mentioned terminal of said switch and on the other side with the pole of the armature opposite to that with which the first and second mentioned windings are connected, said last mentioned armature pole being connected with said second mentioned winding through a resistance and being connected with one side of a source of current supply, switch means connected with the other side of said source of current supply and adapted to selectively engage said switch terminals to produce when connected with the first mentioned terminal cumulative excitation of said first, second and third mentioned windings to cause the motor to operate as a compound motor and the armature to turn at low speed in one direction, and to produce when the switch means is connected with the second mentioned terminal opposite excitation of said first and third mentioned windings and the second mentioned winding being in series with the armature to thereby cause the motor to operate as a series motor and the armature to rotate at high speed in the opposite direction.

2. A reversible direct current motor having an armature and a field member provided with at least two poles, a continuous field exciting winding wound in series on said field poles and connected on one side with one of the poles of the armature and on the other side with a terminal of a switch, a second continuous field exciting winding wound in series on said field poles and connected on one side with the other terminal of said switch and on the opposite side with the same pole of the armature as the first mentioned winding, and said second mentioned winding having a relatively lesser number of turns than said first mentioned winding, a third continuous field exciting winding wound in series on said field poles and connected on one side with the first mentioned terminal of said switch and on the other side with the pole of the armature opposite to that with which the first and second mentioned windings are connected, said last mentioned armature pole being connected with said second mentioned winding through a resistance and being connected with one side of a source of current supply, switch means connected with the other side of said source of current supply and adapted to selectively engage said switch terminals to produce when connected with the first mentioned terminal cumulative excitation of said first and second and third mentioned windings to cause the motor to operate as a compound motor and the armature to turn at low speed in one direction, and to produce when the switch means is connected with the second mentioned terminal opposite excitation of said first and third mentioned windings and the second mentioned winding being in series with the armature to thereby cause the motor to operate as a series motor and the armature to rotate at high speed in the opposite direction, the motor operating in both directions at substantially the same speed ratio with reference to torque from no-load to stall.

GERALD KRONACHER.

REFERENCES CITED

The following references are of record in the file of this patent:

UNITED STATES PATENTS

| Number | Name | Date |
|---|---|---|
| 1,454,867 | Taliaferro | May 15, 1923 |
| 2,350,680 | Heintz | June 6, 1944 |
| 2,452,966 | Thomas | Nov. 2, 1948 |